United States Patent Office 3,764,273
Patented Oct. 9, 1973

3,764,273
NOVEL MARKER FOR WATER IMMISCIBLE ORGANIC LIQUIDS AND METHOD OF MARKING SAME
Robert J. Turner, Lake Geneva, Wis., and David L. Booth and Richard D. Berry, Crystal Lake, Ill., assignors to Morton-Norwich Products, Inc., Chicago, Ill.
Filed June 14, 1971, Ser. No. 152,922
Int. Cl. C09b 1/02; G01n 21/06
U.S. Cl. 23—230 R
51 Claims

ABSTRACT OF THE DISCLOSURE

A new alkylated quinizarin, 2(2-ethylhexyl) quinizarin, useful for marking water immiscible organic liquids; marked water immiscible organic liquids; and a method of marking said liquids with an additive which may be subsequently extracted from said liquid and easily identified by visual inspection. The method comprises dissolving in the liquid to be marked an additive selected from the group consisting of an alkylated quinizarin, the reaction product of diazotized ortho-tolidine and p-nonylphenol and of diazotized xylidene and p-nonylphenol. The additive is detected by extraction from the marked liquid by means of a water soluble polar organic solvent containing a base and from 0 to about 75 percent by weight of water to yield a distinctively colored extract which is identified by visual inspection. The identification may be further corroborated by chromatographic separation of the additive or by spectrophotometric analysis.

BACKGROUND OF THE INVENTION

Field of the invention

Figure 1:
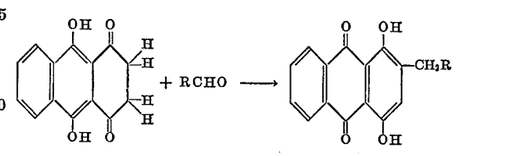

There is a need for a novel compound which is particularly suitable for marking water immiscible organic liquids and which may be extracted easily from said marked liquids and identified. There is also a need for marked water immiscible organic liquids and for means to mark, tag or otherwise identify water immiscible liquids, such as for example, petroleum distillates including gasoline, motive fuels and fuel oils, or other organic solvents, and to distinguish such marked liquids from the otherwise identical but unmarked substances.

These needs arise primarily through the governmental regulatory action of foreign countries, including Canada and most European countries, by which taxes are imposed on motive and heating fuels. The tax regulations of some countries provide that particular dyes and chemical markers must be added to taxable or non-taxable fuels, as the case may be, to provide a means for identification to prove or disprove the payment of taxes. For example, Manitoba Regulation 51/66 under the Motive Fuel Tax Act of Canada, provides the following at paragraph 5 under the caption "Marked and Coloured Motive Fuel"; "Motive fuel used for any of the purposes mentioned in subsection (7) of Section 3 of the Act shall be given a specific colour and separate identity by means of a purple dye and a chemical marker, as may be determined by the minister."

It is, of course, necessary that the added chemical marker be capable of quick and relatively simple identification by non-scientific personnel. In other instances and aside from tax matters, there are occasions when it is desirable to mark a particular production batch of fuel or solvent to prove the origin of the material. As is readily apparent, any marker so used must be added in small concentration, should not affect the physical or chemical properties of the substances to which it is added and should be easily identified by relatively quick and simple means.

Description of the prior art

Among the many additives and tracers which have been proposed for use or are in current use for marking or tagging motive fuels and other petroleum distillates are the metal-organic compounds, radioactive substances, and a variety of specific compounds which react with selected agents to provide intensely colored derivatives. However, many of the proposed additives and those in use have certain disadvantages which render them impractical for marking purposes. For example, the metal-organic compounds have relatively poor storage stability. The use of radioactive substances requires special equipment and precautionary measures to prevent harmful physiological disturbances to personnel. With respect to the specific compounds which have been employed for marking purposes, there may be mentioned quinizarin, furfural, diphenylamine, and various naphthol derivatives.

Quinizarin, though an excellent marker which is extracted from petroleum fuels by aqueous caustic solutions, suffers from the disadvantage of low solvent solubility, i.e., its solubility is generally of the order of magnitude of about 1 percent or less in the commonly used solvents. In the practice of marking petroleum distillates, it is convenient and often mandatory to prepare a marker "pre-concentrate" solution containing from at least about 2 to about 65%, and preferably from about 10 to about 65% of the additive in a fuel-compatible solvent such as toluene or xylene. This pre-concentrate is then metered into the fuel to be marked and homogeneously incorporated therein virtually instantaneously by simple mixing. The relative insolubility of quinizarin in fuel-compatible solvents means that it must be transported and used in the dry state with the attendant handling problems due to dusting and low solubility, and precludes the possibility of providing a pre-concentrate solution containing as much as about 2 or 3% quinizarin. The use of such a relatively dilute quinizarin solution would require the addition of large volumes of pre-concentrate, a situation which is undesirable both from a handling and economic point of view.

Furfural develops an intense red-colored complex with aniline acetate. However, the furfural test is extremely sensitive and the smallest contamination by any furfural naturally present in the liquid to be marked yields a distinct red color. Since a small quantity of furfural is sometimes produced in the normal production of middle petroleum distillates, a positive furfural test is not necessarily conclusive evidence of the presence of added furfural. The same is true of diphenyl amine and various naphthols which may originate in crude oil or arise from the cracking or refining process. Further, at the concentrations generally used in fuels, furfural is unstable to the extent that no positive identification will be obtained after a normal storage period of up to six months.

Other specific marking agents, for example, aniline azo beta naphthol, are extracted from fuels to which they are added by the extractants dimethylformamide or benzyl alcohol to yield a yellow colored extract. However, some times a yellow extract can be obtained by these extractants from unmarked petroleum products, thereby vitiating the test.

Accordingly, it would be desirable to provide a novel, solvent-soluble organic compound for use as an additive in marking water immiscible organic liquids, which compound is entirely foreign to said marked liquids and which compound may be easily extracted from said marked liquids and identified by visual inspection. It would also be desirable to provide a process for marking or tagging water immiscible organic liquids with an additive which has a high solubility in commercially available water immiscible organic solvents, which additive is entirely foreign to said liquids, and which imparts little or no color of its own to the marked liquid, but is easily and conveniently extracted therefrom to yield a distinctive highly colored extract which may be further characterized or specifically identified by ordinary analytical methods.

It is therefore an object of this invention to provide a solvent soluble organic compound suitable as an additive for marking a water immiscible organic liquid.

It is another object of this invention to provide a solvent soluble additive for marking a water immiscible organic liquid, which additive does not occur naturally in said fluid or as a result of processing same, and which additive may be easily extracted from said marked liquid and identified by visual inspection.

It is a further object of this invention to provide a method for marking or otherwise tagging a water immiscible organic liquid with an additive which does not occur naturally in said liquid or as a result of processing same, but which additive upon extraction is easily identifiable.

It is another object of the present invention to provide a method for marking or otherwise tagging a water immiscible organic liquid with an additive, which additive is easily isolated from the marked liquid to yield a distinctively colored substance which may be further identified by analytical procedures.

It is a further object of this invention to provide a method for marking a water immiscible organic liquid, particularly petroleum distillates including gasoline and other motive, heating and lubricating fuels and oils with an additive and for conveniently extracting said additive from said marked liquids, said additive being highly soluble in organic solvents to form a liquid pre-concentrate containing from at least about 2 to about 65% of the additive, and imparting little color of its own to the marked liquid but providing a distinctively colored substance upon extraction from the marked liquid.

It is still another object of the present invention to provide marked water immiscible organic liquids from which the marking additive may be easily extracted and identified by non-scientific personnel to provide evidence of the source of the organic liquid.

The fulfillment of these and other related objects of this invention may be more readily appreciated by reference to the following specification, examples, and appended claims.

SUMMARY OF THE INVENTION

The present invention provides the compound 2(2-ethylhexyl) quinizarin having the formula which is particularly useful as an additive to a water immiscible organic liquid for the purpose of marking or tagging same. It has been found that this compound, when added to such organic liquid, may be detected at a concentration as low as about 0.2 part per million. Its detection is effected by extraction thereof from marked organic liquids by an extractant comprising a water soluble polar organic solvent containing a base and from about 0 to about 75 percent by weight of water to yield a characteristically colored extract. The water soluble polar organic solvent is selected from the group consisting of methanol, ethanol, isopropanol, butanol, dimethylformamide, dimethyl sulfoxide, acetone, ethylene glycol monoethyl ether (available under the trademark Cellosolve) and diethylene glycol monoethyl ether (available under the trademark Carbitol), and the base is selected from the group consisting of alkali metal hydroxides, alkaline earth metal hydroxides and quaternary ammonium hydroxides.

The proportions of water soluble polar organic solvent, water and base are as set forth in Table I.

TABLE I

| Base | Solvent | Water, percent |
|---|---|---|
| At least about 0.5% of an alkali metal hydroxide or an alkaline earth metal hydroxide. | Methanol | 0–40 |
| Do | Ethanol | 0–40 |
| At least about 2% of a quaternary ammonium hydroxide. | Methanol | 0–40 |
| Do | Ethanol | 0–40 |
| At least about 0.5% of an alkali metal hydroxide or an alkaline earth metal hydroxide. | Dimethylformamide | 10–75 |
| At least about 2% of a quaternary ammonium hydroxide. | do | 0–75 |
| At least about 0.5% of an alkali metal hydroxide or an alkaline earth metal hydroxide. | Dimethyl sulfoxide | 10–50 |
| At least about 2% of a quaternary ammonium hydroxide. | do | 0–75 |
| At least about 0.5% of an alkali metal hydroxide or an alkaline earth metal hydroxide. | Isopropanol | 10–40 |
| At least about 2% of a quaternary ammonium hydroxide. | do | 10–50 |
| At least about 0.5% of an alkali metal hydroxide or an alkaline earth metal hydroxide. | Diethylene glycol monoethyl ether. | 10–50 |
| At least about 2% of a quaternary ammonium hydroxide. | do | 0–50 |
| At least about 0.5% of an alkali metal hydroxide or an alkaline earth metal hydroxide. | do | 10–50 |
| At least about 2% of a quaternary ammonium hydroxide. | do | 10–50 |
| At least about 0.5% of an alkali metal hydroxide or an alkaline earth metal hydroxide. | Acetone | 10–50 |
| At least about 2% of a quaternary ammonium hydroxide. | do | 0–50 |
| Do | Butanol | 10–50 |

The alkali metal hydroxide bases comprise lithium hydroxide, sodium hydroxide, potassium hydroxide, rubidium hydroxide and cesium hydroxide. The preferred bases are the sodium and potassium hydroxides, with the most preferred being sodium hydroxide. The alkaline earth metal hydroxides comprise the hydroxides of magnesium, calcium, strontium and barium. The relative water insolubility of these hydroxides when compared with the alkali metal hydroxides require that the alkaline earth metal hydroxides be employed as aqueous slurries. The quaternary ammonium hydroxides are well known as strong bases and are likewise operable in the practice of the present invention.

Among the operable water soluble polar organic solvents useful as components of the extractants of this invention, those preferred are methanol and ethanol in combination with from about 10 to about 40 percent by weight of water and at least about 0.5% of a base such as sodium hydroxide or potassium hydroxide.

The foregoing extractants form a purple colored separate phase (usually the lower phase) which is in distinct contrast to the virtually colorless organic liquid from which the extract is obtained. It was surprising and unexpected to find that 2(2-ethylhexyl) quinizarin is not extracted by a strongly alkaline aqueous solution, as is quinizarin, but that a water soluble polar solvent is required to effect the extraction. Another unusual and unexpected property of 2(2-ethylhexyl) quinizarin is its extraordinarily high solubility in various organic solvents, particularly in xylene, when compared to the solubility of its adjacent homologues. Thus the solubility in xylene of 2(2-ethylhexyl) quinizarin at 25° C. is about 65 percent by weight whereas the solubilities of its adjacent homologues are as follows:

|  | Solubility, percent by weight |
|---|---|
| 2-n-pentyl quinizarin | 21.0 |
| 2-methylpentyl quinizarin | 26.0 |
| 2-n-hexyl quinizarin | 12.3 |
| 2-n-heptyl quinizarin | 12.0 |
| 2-n-octyl quinizarin | 13.7 |
| 2-n-nonyl quinizarin | 12.1 |

These solubility relationships are depicted graphically in the drawing where the number of carbon atoms in the alkyl group is plotted along the abscissa, and the percent solubility in xylene at 25° C. is plotted along the ordinate. As is readily evident, the unusually high solubility in xylene of 2(2-ethylhexyl) quinizarin makes it a preferred marker since it can be supplied in a convenient liquid pre-concentrate form containing as much as 60–65% by weight of the compound, and can be incorporated virtually instantly in an organic liquid by simple admixture therewith.

The compound 2(2-ethylhexyl) quinizarin is conveniently prepared by the condensation of leuco quinizarin with 2-ethylhexaldehyde according to the well-known Marschalk reaction as depicted in the following equation:

The reaction is carried out in a polar organic solvent in the presence of a basic catalyst at a temperature ranging from about 70° C. to about 120° C.

The present invention also provides a method of marking a water immiscible organic liquid with an additive and subsequently determining the presence of said additive in said marked organic liquid, said method comprising dissolving in said liquid at least about 0.2 part per million of an additive selected from the group consisting of:

(I) a quinizarin derivative of the general structure:

where R is an alkyl group containing from 1 to 20 carbon atoms, or the furfuryl radical, (II)

and

(III)

and extracting said additive from said marked liquid with an extractant which is the same as that hereinbefore described and set forth for use with 2(2-ethylhexyl) quinizarin to yield a characteristically colored extract. This extract may be further characterized or identified by commonly used chromatographic or spectrophotometric analytical methods.

The term "alkyl" as used herein is understood to include n-alkyl, branched alkyl, substituted alkyl and cyclic alkyl.

The compound is the reaction product of diazotized ortho tolidine with p-nonylphenol, and is conveniently referred to as p-nonylphenol←ortho - tolidine→p - nonylphenol. Similarly, the compound is the reaction product of diazotized xylidine and p-nonylphenol, and is conveniently referred to as xylidine→p-nonylphenol. For the sake of convenience, this shorthand nomenclature will be employed for the reaction product of diazotized ortho-tolidine and/or diazotized xylidine with p-nonylphenol.

The present invention also provides a marked water immiscible organic liquid characterized in that it contains as a marking ingredient at least about 0.2 part per million but less than that amount which would produce a substantially visible coloration in the marked organic liquid of an additive selected from the group consisting of:

(I) a quinizarin derivative of the general structure where R is an alkyl group containing from 1 to 20 carbon atoms,
or the furfuryl radical, (II)

$$\text{HO} \underset{C_9H_{19}}{\bigcirc} -N=N- \underset{CH_3}{\bigcirc} - \underset{CH_3}{\bigcirc} -N=N- \underset{OH}{\overset{C_9H_{19}}{\bigcirc}}$$

and (III)

$$\underset{CH_3}{\overset{CH_3}{\bigcirc}} -N=N- \underset{OH}{\overset{C_9H_{19}}{\bigcirc}}$$

The marking ingredient of the marked water immiscible liquid is capable of being extracted from said liquid with the same extractant as that hereinbefore described and set forth for use with 2(2-ethylhexyl) quinizarin to yield a characteristically colored extract which may be further characterized or identified by commonly used analytical methods.

This invention also provides a method of determining the fact of marking or tagging of an apparently substantially colorless water immiscible organic liquid containing as a marker an additive selected from the group consisting of:

(I) a quinizarin derivative of the general structure $$\begin{array}{c}\text{O} \quad \text{OH} \\ \bigcirc\bigcirc - R \\ \text{O} \quad \text{OH}\end{array}$$

where R is an alkyl group containing from 1 to 20 carbon atoms, or the furfuryl radical, (II)

$$\text{HO} \underset{C_9H_{19}}{\bigcirc} -N=N- \underset{CH_3}{\bigcirc} - \underset{CH_3}{\bigcirc} -N=N- \underset{OH}{\overset{C_9H_{19}}{\bigcirc}}$$

and (III)

$$\underset{CH_3}{\overset{CH_3}{\bigcirc}} -N=N- \underset{OH}{\overset{C_9H_{19}}{\bigcirc}}$$

said method comprising admixing said marked liquid with an extractant comprising a water soluble polar organic solvent containing a base and from about 0 to about 75 percent by weight of water, and agitating the admixture to obtain an extract having a characteristic and distinct coloration. The extractant employed is the same as that described and set forth for use with 2(2-ethylhexyl) quinizarin.

The method of the present invention has broad applicability for marking a wide variety of water immiscible organic liquids, such as for example, aromatic solvents, aliphatic solvents, mixed aromatic-aliphatic solvents, chlorinated solvents, motive fuels such as gasoline, jet fuel, diesel fuel and fuel oils, lubricating oils, vegetable oils and esters. The present method is particularly useful in marking petroleum products such as gasoline, and other motive and heating fuels, and will therefore be elucidated in connection with marking these products, it being understood, however, that the invention is not limited to this particular field of application.

It is generally agreed by those skilled in the art of marking fuel or other immiscible organic liquids that the essential requirements of a successful additive marker are:

(1) The additive or marker must be a substance which is otherwise foreign to the liquid to be marked.

(2) It must be detectable in low concentrations by a simple qualitative test which can be carried out by non-scientific personnel at any location.

(3) It must have a high solubility in aliphatic and aromatic solvents so that liquid "preconcentrates" of relatively high additive concentration may be prepared.

(4) It must have good storage stability and be physiologically innocuous.

(5) Its presence must be capable of absolute corroborative identification by confirmatory laboratory tests.

The additive markers of the present invention fulfill these requirements and overcome the disadvantages noted for prior art additives. It should be understood that the primary function of the present markers is not as dyes and that there is a distinction between a dye and a marker used to identify or tag another substance. A dye imparts a particular and obvious visible coloration to a fuel, for example, but is not necessarily extractable therefrom. A marker need not itself impart a visible coloration to a fuel or solvent to which it is added, but its presence must be detectable and identifiable, either by extraction or other means. The markers of this invention, at the concentrations usually employed in tagging petroleum distillates, provide little visible coloration to the host liquid but exhibit characteristic colored concentrates when isolated by the extractants of the present invention.

The markers of the present invention are conveniently provided in suitable "pre-concentrate" solutions in toluene, xylene or other commercially available solvents. As previously stated, the concentration or marker in such pre-concentrates ranges from about 2 to about 65% and preferably from about 10 to about 60%. The effective concentration of marker in the marked fluid may be as low as about 0.2 part per million and still provide a distinctively colored extract. Concentrations of additive ranging from about 1 to about 30 parts per million are preferred. Although concentrations in excess of 30 p.p.m. are operable, it is generally not necessary to exceed this level since the desired effect may be obtained at lower concentrations with commensurate savings in cost.

As hereinbefore mentioned, quinizarin is completely extracted from organic fluids by strongly alkaline aqueous solutions. It was therefore surprising to find that, in contrast to quinizarin, 2(2-ethylhexyl) quinizarin and the other alkylated quinizarins of the present invention are not extracted from petroleum distillates by aqueous alkaline solutions. It was discovered however, that they are readily extracted by strongly alkaline aqueous solutions provided there is present a significant proportion of a water soluble polar organic solvent. As stated, this solvent may be methanol, ethanol, isopropanol, butanol, dimethylformamide, dimethyl sulfoxide, acetone, Cellosolve and Carbitol. In the instance where the preferred solvents methanol and ethanol are used, the concentration of these solvents may vary from 100% to about 60%, i.e., the water content may range from 0 to about 40%. The preferred bases, sodium hydroxide and potassium hydroxide, may be present in a concentration as little as about 0.5%, although it is preferred to use from about 3% to 5%.

Concentrations greater than 5% are operable but unnecessary since the lower concentrations provide adequate extraction. In one preferred aspect of this invention, the extractant comprises about 75–90% methanol, about 25–10% $H_2O$ and about 5% of an alkali metal hydroxide such as sodium hydroxide or potassium hydroxide.

In practice, a pre-concentrate marker solution is conveniently provided by dissolving in toluene or xylene from about 10–65% of one of the present markers. This socalled pre-concentrate may be incorporated virtually instantaneously and homogeneously in gasoline or other fuel in such proportion to provide at least about 0.2 p.p.m., and preferably from about 1 to about 30 p.p.m. of marker additive in the host liquid. The marker provides only a slight tint to the gasoline and its presence is otherwise not apparent. As a matter of fact, if desired, it is possible to add in addition to the marker conventional dyes which actually color the gasoline, since these coloring agents will not interfere with the present marking method. Thus it is possible to provide a product containing a combination of any desired dye and marker. For identification purposes, the extraction of marker from the gasoline may be conveniently carried out at the site of the gasoline storage tanks or on the highway by the following procedure. A 125 ml. stoppered separatory funnel is filled with 100 ml. of the marked fuel. Five milliliters of the extractant is added and the whole is shaken vigorously for about 30 to 40 seconds. In the instance where the additive is one of the present alkylated quinizarin derivatives, a bright purple colored layer immediately settles out in the lower phase and is readily visible. Where the additive is one of the reaction products of diazotized ortho tolidine with p-nonylphenol or xylidine with p-nonylphenol, the color of the aqueous extract is bright red. The extraction test is simple and can be carried out quickly and conveniently by non-scientific personnel. A control with unmarked fuel demonstrates that no color is removed by the procedure. This quick on-the-spot test can be corroborated by the following more formal laboratory identification procedure which may be employed when the marker is 2(2-ethylhexyl) quinizarin.

The marked fuel is percolated through a column of silica gel. A convenient column size is ½ x 2 inches. It is best to pre-wet the column with isooctane and to flush the remaining fuel with isooctane after passage. Isooctane is also recommended for dilution of viscous oil samples to speed percolation.

After the passage of the fuel through the column a 1–2 cm. orange zone will be present. This contains virtually all of the standard dyes used in petroleum products and almost all impurities and additives. The marker is also contained in or near this zone. The marker can be separated from the impurities and be observed to move down the column by elution with benzene. With a properly packed column, the marker can be collected in 10 ml. of effluent as an orange color. Colorimetric examination of the effluent against a standard yields semi-quantitative information on the marked fuel content. 2(2-ethlyhexyl quinizarin has a major absorption maximum at 489 mu.

Confirmation of the marker can be made by at least two additional procedures.

(1) Spectrophotometric examination of the caustic extracts will show a characteristic absorption maximum for this marker at 598 mu and a second peak at 560 mu.

(2) Thin layer chromatography on silica gel substrates with benzene eluent will show a characteristic $R_f$ value for the marker.

In the instance where the marked organic liquid is a diesel fuel or other oily liquid prone to present emulsification problems during extraction, the marked liquid is first diluted with an equal volume of a petroleum distillate such as, for example, one commercially available under the trademark Skellysolve B. If substances are present in the liquid to be marked which interfere with the analytical confirmation of the additive by the spectrophotometric method, these substances can be removed by first preextracting the marked liquid with an aqueous methanol solution followed by extraction with an aqueous caustic solution.

A preferred alkyl quinizarin marker of this invention is 2(2-ethylhexyl) quinizarin. This marker, as previously stated, by comparison with the other alkylated quinizarins of this invention displays unexpected and unusually higher solubility in a variety of solvents and particularly in xylene.

The reaction products of diazotized ortho tolidine and diazotized xylidine with p-nonylphenol also form suitable markers. These products and mixtures thereof, perform satisfactorily as markers in the same concentration as and in a manner similar to the alkyl quinizarins. In fact, the extraction procedure employed for the alkyl quinizarins also serves for these coupled products which generally yield a reddish colored extract.

For a more complete understanding of the present invention, reference is now made to the following specific examples illustrating the novel marking compound, marking process and marked fuels of the present invention.

DESCRIPTION OF THE PREFERRED EMBODIMENTS

Example 1

Preparation of alkyl quinizarin derivatives.—The well-known Marschalk reaction is employed to prepare the following alkylated quinizarins by the condensation of leucoquinizarin with the appropriate aldehyde according to the following equation:

where the following aldehydes yield the indicated alkyl quinizarins.

| Aldehyde: | Quinizarin |
|---|---|
| Acetaldehyde | 2-ethyl quinizarin. |
| n-Propylaldehyde | 2-n-propyl quinizarin. |
| Isobutyraldehyde | 2-isobutyl quinizarin. |
| n-Butyraldehyde | 2-n-butyl quinizarin. |
| n-Valeraldehyde | 2-n-pentyl quinizarin. |
| n-Hexaldehyde | 2-n-hexyl quinizarin. |
| 2-methylpentylaldehyde | 2(2 - methylpentyl) quinizarin. |
| n-Heptaldehyde | 2-n-heptyl quinizarin. |
| 2-ethylhexaldehyde | 2(2 - ethylhexyl) quinizarin. |
| n-Octylaldehyde | 2-n-octylaldehyde. |
| n-Nonylaldehyde | 2-n-nonyl quinizarin. |
| n-Dodecylaldehyde | 2(n-dodecyl) quinizarin. |
| Octadecylaldehyde | 2(octadecyl) quinizarin. |
| Furfuraldehyde | 2-furfuryl quinizarin. |
| Cyclohexane carboxaldehyde. | 2($\alpha$ - cyclohexylmethyl) quinizarin. |

The reaction is carried out in a polar organic solvent, e.g., Carbitol or dimethylformamide, in the presence of a basic catalyst, such as for example, benzyltrimethylammonium hydroxide or piperidinium acetate. The condensation is conducted at a temperature ranging from about 70°–120° C. until complete. The completion of the reaction is determined by thin layer chromatograph (TLC) on silica gel. When the condensation is complete, the reaction is cooled slowly to room temperature (or colder) and the alkylated quinizarin is allowed to crystallize. The product is filtered, washed with methanol and water, and then air dried. The product may be purified by recrystallization from benzene or petroleum naphtha. Thus 2-ethyl quinizarin, 2-propyl quinizarin and 2-butyl quinizarin were recrystallized from benzene whereas 2-pentyl quinizarin, 2(2-methylpentyl) quinizarin, 2(2-ethylhexyl) quinizarin, 2-heptyl quinizarin and 2(n-dodecyl) quinizarin were recrystallized from petroleum naphtha.

Example 2

The following alkylated quinizarins were each added to white gasoline and to No. 2 fuel oil respectively at a concentration of 10 p.p.m. and 1 p.p.m. respectively:

2-n-propyl quinizarin
2-n-butyl quinizarin
2-n-pentyl quinizarin
2(2-methylpentyl) quinizarin
2-n-heptyl quinizarin
2(2-ethylhexyl) quinizarin.

2-octadecyl quinizarin was added to white gasoline at a concentration of 10 p.p.m.

A sample of one hundred milliliters of each of the marked fuels was extracted with 5 ml. of a 5% aqueous sodium hydroxide solution. There was no detectable extraction of any of the above alkylated quinizarin markers.

The above procedure was repeated with the exception that each of the marked fuels was extracted with 5 ml. of methanol containing 5% by weight of sodium hydroxide. A deep purple-colored lower phase indicating extraction of the alkyl quinizarin was obtained from each sample of marked fuel.

Examples 3 through 66

A marked petroleum feul (white gasoline) was prepared by adding thereto 2(2-ethylhexyl)quinizarin at a concentration of 10 p.p.m. One hundred milliliter samples of the marked fuel were extracted separately in a separatory funnel with 5 ml. of each of the following extractants, with the indicated results as set forth in the following examples:

| Example | Extractant Base | Solvent | Concentration, percent | Color of extract |
|---|---|---|---|---|
| 3 | 5% NaOH | Methanol | 100 | Purple. |
| 4 | 5% KOH | do | 100 | Do. |
| 5 | 5% NaOH | Methanol/H₂O | [1] 90/10 | Do. |
| 6 | 5% NaOH | do | 80/20 | Do. |
| 7 | 5% NaOH | do | 70/30 | Do. |
| 8 | 5% NaOH | do | 60/40 | Do. |
| 9 | 5% NaOH | do | 50/50 | Colorless—No extraction. |
| 10 | 3% NaOH | do | 90/10 | Purple. |
| 11 | 2% NaOH | do | 90/10 | Do. |
| 12 | 1% NaOH | do | 90/10 | Do. |
| 13 | 0.5% NaOH | do | 90/10 | Do. |
| 14 | 5% NaOH | Ethanol/H₂O | 90/10 | Do. |
| 15 | 5% BTMAH [2] | Methanol | 100 | Do. |
| 16 | 5% BTMAH | Methanol/H₂O | 90/10 | Do. |
| 17 | 1% BTMAH | do | 90/10 | Do. |
| 18 | 1% BTMAH | do | 80/20 | Do. |
| 19 | 1% BTMAH | do | 70/30 | Do. |
| 20 | 1% BTMAH | do | 50/50 | Colorless—No extraction. |
| 21 | 5% BTMAH | do | 25/75 | Do. |
| 22 | 5% BTMAH | Ethanol/H₂O | 50/50 | Purple. |
| 23 | 5% LiOH | Methanol/H₂O | 90/10 | Do. |
| 24 | 5% Ba(OH)₂ | do | 90/10 | Do. |
| 25 | 5% Ba(OH)₂ | do | 70/30 | Do. |
| 26 | 5% Ca(OH)₂ | do | 90/10 | Do. |
| 27 | 5% Mg(OH)₂ | do | 70/30 | Do. |
| 28 | 5% NaOH | Dimethylformamide/H₂O | 80/20 | Do. |
| 29 | 5% NaOH | do | 50/50 | Do. |
| 30 | 5% NaOH | do | 25/75 | Do. |
| 31 | 1% NaOH | do | 90/10 | Do. |
| 32 | 1% NaOH | do | 80/20 | Do. |
| 33 | 5% BTMAH | Dimethylformamide | 100 | Do. |
| 34 | 5% BTMAH | Dimethylformamide/H₂O | 50/50 | Do. |
| 35 | 5% BTMAH | do | 25/75 | Do. |
| 36 | 2% BTMAH | do | 25/75 | Do. |
| 37 | 1% BTMAH | do | 25/75 | Colorless—No extraction. |
| 38 | 5% NaOH | Dimethyl sulfoxide/H₂O | 50/50 | Purple. |
| 39 | 5% BTMAH | Dimethyl sulfoxide | 100 | Do. |
| 40 | 5% BTMAH | Dimethyl sulfoxide/H₂O | 90/10 | Do. |
| 41 | 2% BTMAH | do | 25/75 | Do. |
| 42 | 1% BTMAH | do | 25/75 | Colorless—No extraction. |
| 43 | 1% NaOH | Isopropanol/H₂O | 90/10 | Purple. |
| 44 | 5% NaOH | Isopropanol | 100 | Colorless—No extraction. |
| 45 | 5% BTMAH | Isopropanol/H₂O | 50/50 | Purple. |
| 46 | 5% BTMAH | do | 25/75 | Colorless—No extraction. |
| 47 | 5% BTMAH | Isopropanol | 100 | Do. |
| 48 | 1% NaOH | Carbitol/H₂O | 90/10 | Purple. |
| 49 | 1% NaOH | do | 50/50 | Do. |
| 50 | 5% BTMAH | Carbitol | 100 | Do. |
| 51 | 5% BTMAH | Carbitol/H₂O | 90/10 | Do. |
| 52 | 5% BTMAH | do | 50/50 | Do. |
| 53 | 5% BTMAH | do | 25/75 | Colorless—No extraction. |
| 54 | 5% KOH | Cellosolve/H₂O | 90/10 | Purple. |
| 55 | 5% BTMAH | do | 50/50 | Do. |
| 56 | 5% BTMAH | do | 25/75 | Colorless—No extraction. |
| 57 | 5% BTMAH | Cellosolve | 100 | Do. |
| 58 | 1% NaOH | Butanol/H₂O | 90/10 | Do. |
| 59 | 1% NaOH | do | 50/50 | Do. |
| 60 | 5% BTMAH | Butanol | 100 | Do. |
| 61 | 5% BTMAH | Butanol/H₂O | 90/10 | Purple. |
| 62 | 5% BTMAH | do | 50/50 | Do. |
| 63 | 5% BTMAH | do | 25/75 | Colorless—No extraction. |
| 64 | 1% NaOH | Acetone/H₂O | 90/10 | Purple. |
| 65 | 5% BTMAH | Acetone | 100 | Do. |
| 66 | 5% BTMAH | Acetone/H₂O | 90/80 | Do. |

[1] The terminology "Methanol/H₂O," "90/10" means 90% methanol/10% water (w./w.).
[2] Benzyl trimethyl-ammonium hydroxide.

Example 67

The marker 2(2-ethylhexyl) quinizarin was added to the following commercially available motive fuels at a concentration of 1 p.p.m. and 10 p.p.m. respectively, and subsequently identified by extraction of 100 ml. of marked fuel with 5 ml. of an extractant comprising 5% NaOH in 90/10 methanol/water to yield a distinctive bright purple color in the extract.

Motive fuel:      Manufacturer
- Premium and Regular gasoline ______ Standard Oil Company.
- Premium and Regular gasoline ______ Gulf Oil Company.
- Premium and Regular gasoline ______ Sinclair Oil Company.
- Premium and Regular gasoline ______ Shell Oil Company.
- Premium and Regular gasoline ______ Citgo Oil Company.
- Premium and Regular gasoline ______ Mobil Oil Company.
- Premium and Regular gasoline ______ Skelly Oil Company.
- Premium and Regular gasoline ______ Phillips Petroleum Company.
- White gasoline
- No. 1 fuel oil
- No. 2 fuel oil
- Aviation gasoline
- Jet fuel
- Kerosene
- Diesel fuel In each of the above marked fuels, the extraction procedure of this invention was effective and the bright purple color in the extract of the marked fuel was clearly visible in comparison to a substantially colorless extract of unmarked fuel. To test the sensitivity of these markers as exemplified by 2(2-ethylhexyl) quinizarin, 0.2 p.p.m. of 2(2-ethylhexyl) quinizarin was added to white gasoline and thereafter 100 ml. of the marked fuel was extracted with 5 ml. of a solution comprising 5% NaOH in 90/10 methanol/H$_2$O. The extract was a distinctive pale purple-colored phase.

Example 68

The substituted alkyl quinizarin, 2-furfuryl quinizarin, was added to white gasoline at a concentration of 10 p.p.m. It was subsequently extracted from 100 ml. of the marked fuel with 5 ml. of an extractant comprising 5% NaOH in 90/10 methanol/water to yield a purple colored extract in the lower aqueous phase.

Example 69

The marker 2(2-ethylhexyl) quinizarin was added to gasoline, No. 1 fuel oil, No. 2 fuel oil and diesel fuel, respectively, at a concentration of 10 p.p.m. The efficiency of the extractants of the present invention in extracting all of the marker was determined by the following procedure. The absorbance at 489 mμ of the additive in the petroleum fuel was determined with unmarked fuel as a blank. One hundred ml. of the marked petroleum fuel and 10 ml. of 5% NaOH in 90/10 methanol/water were placed in a first 125 ml. separatory funnel. The funnel was shaken for at least 60 seconds and the layers were allowed to separate. The lower layer containing the marker was drawn off into a secondary separatory funnel containing 10 ml. of 20% HCl and 30 ml. of unmarked petroleum fuel. The caustic-methanol/water extraction procedure was repeated several times on the contents of the first funnel and the extracts were combined with the acid-fuel mixture in the second funnel (the pH of the aqueous layer must be acidic). This results in the transference of the marker back to the petroleum fuel layer.

The aqueous HCl-petroleum fuel mixture was shaken and allowed to separate. The aqueous lyaer was drawn off into a third separatory funnel and extracted twice with 30 ml. portions of petroluem fuel. These extracts were combined with the petroleum fuel in the second funnel and the whole was diluted to 100 ml. with petroleum fuel. The wet fuel was filtered to remove occluded water and its absorbance at 489 mμ was determined, using unmarked petroleum fuel as a blank.

The results were as follows:

| | Percent recovered | |
|---|---|---|
| | Two extracts | Four extracts |
| White gasoline | 100 | |
| No. 1 fuel oil | | 96 |
| No. 2 fuel oil | | 97 |
| Diesel fuel | | 97 |

Example 70

The solubility of each of the following markers of the present invention was determined in xylene at 25° C. These results are set forth in Table I.

TABLE I

| Marker: | Solubility in xylene at 25° C., percent by weight |
|---|---|
| 2-ethyl quinizarin | 2.1 |
| 2-n-propyl quinizarin | 3.9 |
| 2-n-butyl qinizarin | 4.2 |
| 2-isobutyl quinizarin | 9.4 |
| 2-n-pentyl quinizarin | 21 |
| 2(2-methylpentyl) quinizarin | 26 |
| 2-n-hexyl quinizarin | 12.3 |
| 2-heptyl quinizarin | 12.0 |
| 2(2-ethylhexyl) quinizarin | 65 |
| 2-n-octyl quinizarin | 13.7 |
| 2-n-nonyl quinizarin | 12.1 |
| 2-n-dodecyl quinizarin | 10 |
| 2-furfuryl quinizarin | 13.0 |
| 2-(α-cyclohexylmethyl) quinizarin | 19.0 |

Example 71

The product of the coupling reaction between diazotized ortho-tolidine and p-nonyl phenol is prepared by a conventional coupling procedure after which it is isolated and purified to provide a marker which may be represented as follows: p-nonylphenol ← ortho-tolidine → p-nonylphenol. In similar manner the product of the coupling reaction between diazotized xylidine and p-nonylphenol is prepared to provide a product which may be represented as follows: xylidine→p-nonylphenol. Each of these markers was added, respectively, at a concentration of 10 p.p.m. to white gasoline. One hundred milliliters of the marked gasoline was extracted with 5 ml. of a solution consisting of 5% NaOH in 90/10 methanol/water to yield a bright red color in the extract in each instance.

Example 72

The marker 2(2-ethylhexyl) quinizarin was added at a concentration of 10 p.p.m. to each of the following water immiscible liquids:

Chloroform
Methylene chloride
Perchloroethylene
Benzene
Toluene
Xylene
Skellysolve B (an aliphatic pertoleum distillate)
Mineral spirits
Isooctane
Styrene
Linseed oil
Ethyl acetate
Dioctyl adipate
Dibutyl phthalate A sample of 100 ml. of each of the marked liquids was extracted with 5 ml. of a 5% NaOH in 90/10 methanol/water solution. A deep purple colored extract was obtained from each sample of marked liquid. In the instance of the chlorinated solvents, the purple colored extract was in the upper alkaline phase.

We claim:

1. A method of marking a water immiscible organic liquid with an additive and subsequently determining the presence of said additive in said marked organic liquid, said method comprising dissolving in said liquid at least about 0.2 part per million of an additive selected from the group consisting of:

(I) a quinizarin derivative of the general structure:

wherein R is an alkyl group containing from 1 to 20 carbon atoms, or the furfuryl radical, (II)

and (III)

and extracting said additive from said marked liquid with an extractant comprising a water soluble polar organic solvent containing a base and from about 0 to about 75 weight percent of water to yield a characteristically colored extract, the water soluble polar organic solvent being selected from the group consisting of methanol, ethanol, isopropanol, butanol, dimethylformamide, dimethyl sulfoxide, acetone, ethylene glycol monoethyl ether, and diethylene glycol monoethyl ether, and the base being selected from the group consisting of alkali metal hydroxides, alkaline earth metal hydroxides and quaternary ammonium hydroxides.

2. The method of claim 1 wherein the proportions of water soluble polar organic solvent, water and base are as follows:

| Base | Solvent | Water, percent |
|---|---|---|
| At least about 0.5% of an alkali metal hydroxide or an alkaline earth metal hydroxide. | Methanol | 0-ca. 40 |
| Do | Ethanol | 0-40 |
| At least about 2% of a quaternary ammonium hydroxide. | Methanol | 0-40 |
| Do | Ethanol | 0-40 |
| At least about 0.5% of an alkali metal hydroxide or an alkaline earth metal hydroxide. | Dimethylformamide | 10-75 |
| At least about 2% of a quaternary ammonium hydroxide. | ....do.... | 0-75 |
| At least about 0.5% of an alkali metal hydroxide or an alkaline earth metal hydroxide. | Dimethyl sulfoxide | 10-60 |
| At least about 2% of a quaternary ammonium hydroxide. | ....do.... | 0-75 |
| At least about 0.5% of an alkali metal hydroxide or an alkaline earth metal hydroxide. | Isopropanol | 10-40 |
| At least about 2% of a quaternary ammonium hydroxide. | ....do.... | 10-60 |
| At least about 0.5% of an alkali metal hydroxide or an alkaline earth metal hydroxide. | Diethylene glycol monoethyl ether. | 10-50 |
| At least about 2% of a quaternary ammonium hydroxide. | ....do.... | 0-50 |
| At least about 0.5% of an alkali metal hydroxide or an alkaline earth metal hydroxide. | Ethylene glycol monoethyl ether. | 10-50 |
| At least about 2% of a quaternary ammonium hydroxide. | ....do.... | 10-50 |
| At least about 0.5% of an alkali metal hydroxide or an alkaline earth metal hydroxide. | Acetone | 10-50 |
| At least about 2% of a quaternary ammonium hydroxide. | ....do.... | 0-50 |
| Do | Butanol | 10-50 |

3. The method of claim 1 wherein the water immiscible organic liquid is selected from the group consisting of aromatic solvents, aliphatic solvents, mixed aromatic-aliphatic solvents, chlorinated solvents, motive fuels, heating fuels, lubricating oils, vegetable oils and esters.

4. The method of claim 1 wherein the additive is the quinizarin derivative of the indicated structure in which R is $CH_3$.

5. The method of claim 1 wherein the additive is the quinizarin derivative of the indicated structure in which R is $C_2H_5$.

6. The method of claim 1 wherein the additive is the quinizarin derivative of the indicated structure in which R is $C_3H_7$.

7. The method of claim 1 wherein the additive is the quinizarin derivative of the indicated structure in which R is $C_4H_9$.

8. The method of claim 1 wherein the additive is the quinizarin derivative of the indicated structure in which R is $C_5H_{11}$.

9. The method of claim 1 wherein the additive is the quinizarin derivative of the indicated structure in which R is $C_6H_{13}$.

10. The method of claim 1 wherein the additive is the quinizarin derivative of the indicated structure in which R is $C_7H_{15}$.

11. The method of claim 1 wherein the additive is the quinizarin derivative of the indicated structure in which R is $C_8H_{17}$.

12. The method of claim 1 wherein the additive is 2(2-ethylhexyl) quinizarin.

13. The method of claim 1 wherein the additive is the quinizarin derivative of the indicated structure in which R is $C_9H_{19}$.

14. The method of claim 1 wherein the additive is the quinizarin derivative of the indicated structure in which R is $C_{12}H_{25}$.

15. The method of claim 1 wherein the additive is the quinizarin derivative of the indicated structure in which R is $C_{18}H_{37}$.

16. The method of claim 1 wherein the additive is the quinizarin derivative of the indicated structure in which R is furfuryl.

17. The method of claim 2 wherein the additive is 2(2-ethylhexyl) quinizarin, the water soluble polar organic solvent is methanol containing from 0 to about 40 percent by weight of water and the base is sodium hydroxide.

18. The method of claim 2 wherein the additive 2(2-ethylhexyl) quinizarin, the water soluble polar organic solvent is methanol containing from 0 to about 40 percent by weight of water and the base is a quaternary ammonium hydroxide.

19. The method of claim 2 wherein the additive is 2(2-ethylhexyl) quinizarin, the water soluble polar organic solvent is methanol containing from 0 to about 20 percent by weight of water, and the base is sodium hydroxide.

20. The method of claim 2 wherein the additive is 2(2-ethylhexyl) quinizarin, the water soluble polar organic solvent is methanol containing from 0 to about 40 percent by weight of water and the base is potassium hydroxide.

21. The method of claim 2 wherein the additive is 2(2-ethylhexyl) quinizarin, the water soluble polar organic solvent is ethanol containing from about 0 to about 40 percent by weight of water, and the base is sodium hydroxide.

22. The method of claim 2 wherein the additive is 2(2-ethylhexyl) quinizarin, the water soluble polar organic solvent is ethanol containing from about 0 to about 40 percent by weight of water, and the base is potassium hydroxide.

23. The method of claim 2 wherein the additive is 2(2-ethylhexyl) quinizarin, the water soluble polar organic solvent is ethanol containing from about 0 to about 40 percent by weight of water, and the base is a quarternary ammonium hydroxide.

24. The method of claim 2 wherein the additive is 2(2-ethylhexyl) quinizarin, the water soluble polar organic solvent is dimethylformamide containing from about 10 to about 75 percent by weight of water, and the base is sodium hydroxide.

25. The method of claim 2 wherein the additive is 2(2-ethylhexyl) quinizarin, the water soluble polar organic solvent is dimethylformamide containing from about 10 to about 75 percent by weight of water, and the base is potassium hydroxide.

26. The method of claim 2 wherein the additive is 2(2-ethylhexyl) quinizarin, the water soluble polar organic solvent is dimethylformamide containing from 0 to 75% by weight of water, and the base is a quaternary ammonium hydroxide.

27. The method of claim 2 wherein the additive is 2(2-ethylhexyl) quinizarin, the water soluble polar organic solvent is dimethyl sulfoxide containing from about 10 to about 50 percent by weight of water, and the base is sodium hydroxide.

28. The method of claim 2 wherein the additive is 2(2-ethylhexyl) quinizarin. the water soluble polar organic solvent is dimethyl sulfoxide containing from about 10 to about 50 percent by weight of water, and the base is potassium hydroxide.

29. The method of claim 2 wherein the additive is 2(2-ethylhexyl) quinizarin, the water soluble polar organic solvent is dimethyl sulfoxide containing from about 0 to about 75 percent by weight of water, and the base is a quarternary ammonium.

30. The method of claim 2 wherein the additive is 2(2-ethylhexyl) quinizarin, the water soluble polar organic solvent is isopropanol containing from about 10 to about 40 percent by weight of water, and the base is sodium hydroxide.

31. The method of claim 2 wherein the additive is 2(2-ethylhexyl) quinizarin, the water soluble polar organic solvent is isopropanol containing from about 10 to about 40 percent by weight of water, and the base is potassium hydroxide.

32. The method of claim 2 wherein the additive is 2(2-ethylhexyl) quinizarin, the water soluble polar organic solvent is isopropanol containing from 10 to about 50 percent by weight of water, and the base is a quaternary ammonium hydroxide.

33. The method of claim 2 wherein the additive is 2(2-ethylhexyl) quinizarin, the water soluble polar organic solvent is diethylene glycol monoethyl ether containing from about 10 to about 50 percent by weight of water, and the base is sodium hydroxide.

34. The method of claim 2 wherein the additive is 2(2-ethylhexyl) quinizarin, the water soluble polar organic solvent is diethylene glycol monoethyl ether containing from about 10 to about 50 percent by weight of water, and the base is potassium hydroxide.

35. The method of claim 2 wherein the additive is 2(2-ethylhexyl) quinizarin, the water soluble polar organic solvent is diethylene glycol monoethyl ether containing from about 0 to about 50 percent by weight of water, and the base is a quaternary ammonium hydroxide.

36. The method of claim 2 wherein the additive is 2(2-ethylhexyl) quinizarin, the water soluble polar organic solvent is ethylene glycol monoethyl ether containing from about 10 to about 50 percent by weight of water, and the base is sodium hydroxide.

37. The method of claim 2 wherein the additive is 2(2-ethylhexyl) quinizarin, the water soluble polar organic solvent is ethylene glycol monoethyl ether containing from about 10 to about 50 percent by weight of water, and the base is potassium hydroxide.

38. The method of claim 2 wherein the additive is 2(2-ethylhexyl) quinizarin, the water soluble polar organic solvent is ethylene glycol monoethyl ether containing from about 10 to about 50 percent by weight of water, and the base is a quaternary ammonium hydroxide.

39. The method of claim 2 wherein the additive is 2(2-ethylhexyl) quinizarin, the water soluble polar organic solvent is acetone containing from about 10 to about 50 percent by weight of water, and the base is sodium hydroxide.

40. The method of claim 2 wherein the additive is 2(2-ethylhexyl) quinizarin, the water soluble polar organic solvent is acetone containing from about 10 to about 50 percent by weight of water, and the base is potassium hydroxide.

41. The method of claim 2 wherein the additive is 2(2-ethylhexyl) quinizarin, the water soluble polar organic solvent is acetone containing from about 0 to about 50 percent by weight of water, and the base is a quaternary ammonium hydroxide.

42. The method of claim 2 wherein the additive is 2(2-ethylhexyl) quinizarin, the water soluble polar organic solvent is butanol containing from about 10 to about 50 percent by weight of water, and the base is a quaternary ammonium hydroxide.

43. The method of claim 2 wherein the additive is $$\underset{C_9H_{19}}{\underset{|}{\overset{OH}{\underset{|}{\bigcirc}}}}-N=N-\underset{}{\overset{CH_3}{\underset{|}{\bigcirc}}}-\underset{}{\overset{CH_3}{\underset{|}{\bigcirc}}}-N=N-\underset{OH}{\overset{C_9H_{19}}{\underset{|}{\bigcirc}}}$$

the water soluble polar organic solvent is methanol containing from about 0 to about 40 percent by weight of water, and the base is sodium hydroxide.

44. The method of claim 43 wherein the base is potassium hydroxide.

45. The method of claim 43 wherein the base is a quaternary ammonium hydroxide.

46. The method of claim 2 wherein the additive is $$\underset{CH_3}{\overset{CH_3}{\bigcirc}}-N=N-\underset{OH}{\overset{C_9H_{19}}{\bigcirc}}$$

the water soluble polar organic solvent is methanol containing from about 0 to about 40 percent by weight of water, and the base is sodium hydroxide.

47. The method of claim 46 wherein the base is potassium hydroxide.

48. The method of claim 46 wherein the base is a quaternary ammonium hydroxide.

49. A method of determining the fact of marking or tagging of an apparently substantially colorless water immiscible organic liquid containing as a marker an additive selected from the group consisting of:

(I) a quinizarin derivative of the general structure:

wherein R is an alkyl group containing from 1 to 20 carbon atoms, or the furfuryl radical,

II and (III)

said method comprising admixing said marked liquid with an extractant comprising a water soluble polar organic solvent containing a base and from about 0 to about 75 percent by weight of water, and agitating the admixture to obtain an extract having a characteristic and distinct coloration.

50. The method of claim 49 wherein the water immiscible organic liquid is selected from the group consisting of aromatic solvents, aliphatic solvents, mixed aromatic-aliphatic solvents, chlorinated solvents, motive fuels, heating fuels, lubricating oils, vegetable oils and esters, and the base is selected from the group consisting of alkali metal hydroxides, alkaline earth metal hyrdroxides and quaternary ammonium hydroxides.

51. The method of claim 49 wherein the proportions of water soluble polar organic solvent, base and water are as follows:

| Base | Solvent | Water, percent |
|---|---|---|
| At least about 0.5% of an alkali metal hydroxide or an alkaline earth metal hydroxide. | Methanol | 0-ca. 40 |
| Do. | Ethanol | 0-40 |
| At least about 2% of a quaternary ammonium hydroxide. | Methanol | 0-40 |
| Do. | Ethanol | 0-40 |
| At least about 0.5% of an alkali metal hydroxide or an alkaline earth metal hydroxide. | Dimethylformamide | 10-75 |
| At least about 2% of a quaternary ammonium hydroxide. | do | 0-75 |
| At least about 0.5% of an alkali metal hydroxide or an alkaline earth metal hydroxide. | Dimethyl sulfoxide | 10-50 |
| At least about 2% of a quaternary ammonium hydroxide. | do | 0-75 |
| At least about 0.5% of an alkali metal hydroxide or an alkaline earth metal hydroxide. | Isopropanol | 10-40 |
| At least about 2% of a quaternary ammonium hydroxide. | do | 10-50 |
| At least about 0.5% of an alkali metal hydroxide or an alkaline earth metal hydroxide. | Diethylene glycol monoethyl ether. | 10-50 |
| At least about 2% of a quaternary ammonium hydroxide. | do | 0-50 |
| At least about 0.5% of an alkali metal hydroxide or an alkaline earth metal hydroxide. | Ethylene glycol monoethyl ether. | 10-50 |
| At least about 2% of a quaternary ammonium hydroxide. | do | 10-50 |
| At least about 0.5% of an alkali metal hydroxide or an alkaline earth metal hydroxide. | Acetone | 10-50 |
| At least about 2% of a quaternary ammonium hydroxide. | do | 0-50 |
| Do | Butanol | 10-50 |

References Cited
UNITED STATES PATENTS

| | | | |
|---|---|---|---|
| 3,082,218 | 3/1963 | Buxbaum | 260—383 X |
| 3,098,826 | 7/1963 | McMordie | 260—383 X |
| 3,361,772 | 1/1968 | May | 260—383 |
| 3,507,887 | 4/1970 | Johnson | 260—383 |
| 3,558,670 | 1/1970 | Hohmann | 260—383 X |

OTHER REFERENCES

K. Field et al.: Analyst, 91, 287–9 (1966).

MORRIS O. WOLK, Primary Examiner

S. MARANTZ, Assistant Examiner

U.S. Cl. X.R.

208—12; 252—408; 260—180, 206, 383